(12) United States Patent
Yokoyama et al.

(10) Patent No.: US 12,061,933 B2
(45) Date of Patent: Aug. 13, 2024

(54) SAMPLING DEVICE

(71) Applicant: NEC Corporation, Tokyo (JP)

(72) Inventors: Harumichi Yokoyama, Tokyo (JP); Zhongyuan Tian, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 454 days.

(21) Appl. No.: 17/427,984

(22) PCT Filed: Feb. 5, 2019

(86) PCT No.: PCT/JP2019/004767
§ 371 (c)(1),
(2) Date: Aug. 3, 2021

(87) PCT Pub. No.: WO2020/161924
PCT Pub. Date: Aug. 13, 2020

(65) Prior Publication Data
US 2022/0121490 A1    Apr. 21, 2022

(51) Int. Cl.
*G06F 3/00* (2006.01)
*G06F 9/48* (2006.01)
*G06F 9/50* (2006.01)

(52) U.S. Cl.
CPC ............ *G06F 9/505* (2013.01); *G06F 9/4881* (2013.01)

(58) Field of Classification Search
CPC ...................................................... G06F 9/455
See application file for complete search history.

(56) References Cited

U.S. PATENT DOCUMENTS

| | | | |
|---|---|---|---|
| 2002/0118831 A1* | 8/2002 | Rhoads | H04L 9/0662 380/59 |
| 2004/0025069 A1* | 2/2004 | Gary | G06F 1/3296 713/300 |
| 2006/0149720 A1* | 7/2006 | Dehlinger | G06F 16/313 707/E17.084 |
| 2006/0200610 A1* | 9/2006 | Yasue | G06F 9/4812 710/264 |
| 2012/0117008 A1 | 5/2012 | Xu et al. | |
| 2014/0059054 A1* | 2/2014 | Liu | G06F 16/313 707/742 |
| 2017/0083364 A1* | 3/2017 | Zhao | G06F 9/5083 |
| 2017/0206466 A1* | 7/2017 | Zoldi | G06F 18/2132 |
| 2019/0095992 A1* | 3/2019 | Soh | G07F 19/20 |
| 2021/0157975 A1* | 5/2021 | Gelosi | G06F 40/166 |
| 2021/0248268 A1* | 8/2021 | Ardhanari | G16H 10/60 |

OTHER PUBLICATIONS

Xi Qiu, Topic words analysis based on LDA model. (Year: 2014).*
(Continued)

*Primary Examiner* — Lechi Truong

(57) ABSTRACT

A sampling device includes a priority assignment method that assigns higher priority to units with more remaining workload, a priority-aware scheduling method that enables units with higher priority to do the sampling and model update when a conflict happens, a modified priority-aware scheduling method that reduces scheduling overhead by re-assigning priority every several iterations, and another modified priority-aware scheduling method that explores different priority re-assignment frequencies and stores the sorted sequences in memory.

7 Claims, 17 Drawing Sheets

(56) References Cited

OTHER PUBLICATIONS

Dong Li, Priority-Based Cache Allocation in Throughput Processors. (Year: 2015).*
International Search Report for PCT Application No. PCT/JP2019/004767, mailed on Apr. 23, 2019.
Feng Yan et al., "Parallel Inference for Latent Dirichlet Allocation on Graphics Processing Units" Advances in Neural Information Processing Systems 22: 23rd Annual Conference on Neural Information Processing Systems 2009, Proceedings of a meeting held Dec. 7-10, 2009, pp. 1-9, Vancouver, Canada.

* cited by examiner

S201: Sort units by their number of remaining tokens

*FIG. 13a*

| Epoch count | N | Iteration count | min_count | Nopt | operations | |
|---|---|---|---|---|---|---|
| 1 | 50 | 1500 | 1500 | 50 | Sort units every N iterations | Explore different N |
| 2 | 100 | 1750 | 1500 | 50 | | |
| 3 | 150 | 1350 | 1350 | 150 | | |
| 4 | 200 | 1980 | 1350 | 150 | | |
| 5 | 250 | 1200 | 1200 | 250 | | |
| 6 | 250 | 1200 | 1200 | 250 | Sort units every Nopt iterations and store sorted sequences | FixN to250 |
| 7 | 250 | 1200 | 1200 | 250 | Load sorted sequences from memory(array 209) | |
| ... | ... | ... | | ... | | |

FIG. 13b  Sorted Sequence Array 509: sorted units from lowest to highest priority

| 1 | 3 | 4 | 2 | ← Iteration 1-250 |
| 3 | 4 | 1 | 2 | ← Iteration 251-500 |
| 1 | 2 | 3 | 4 | ← Iteration 501-550 |
| 4 | 3 | 1 | 2 | ← Iteration 551-1000 |
| 1 | 3 | 4 | 2 | ← Iteration 1001-1200 |

FIG. 13c  Sorted Sequence Array 509: sorted units from lowest to highest priority

| 1 | 3 | 4 | 2 | ← Iteration 1-250 |
| 3 | 4 | 1 | 2 | ← Iteration 251-500 |
| 1 | 2 | 3 | 4 | ← Iteration 501-1200 |

SAMPLING DEVICE

TECHNICAL FIELD

The present invention relates to high-performance computing of large-scale machine learning algorithms, and, in particular, to parallel processing of Latent Dirichlet Allocation (LDA) using vector processors.

BACKGROUND ART

LDA is a generative topic model, which assigns topics to word tokens in a collection of documents. LDA inference finds the posterior distributions of latent variables based on the training documents. The complexity of LDA is linear in data size, and the increasingly massive text data has been attracting great interest in parallel implementations. The vector processors can operate on multiple elements concurrently using vector instructions, and it offers a powerful platform for speeding up large-scale machine learning algorithms.

To parallelize LDA, input text data is divided into P subsets with similar amount of word tokens, and these subsets will be processed in parallel. In terms of vector processors-based implementation, P is the size of the vector length register. At one learning epoch, each of P processing units (hereinafter, sometimes referred to simply as "units") iteratively fetches one token from its corresponding subset, samples the topic, and updates the related part of the topic distribution model. FIG. 1 shows an example of the parallelized LDA implementation in a 4-unit sampling device. As shown in the figure, documents are partitioned into 4 subsets, each assigned to one unit. Each document contains multiple tokens, marked as "X" in FIG. 1. These tokens are some words chosen from the vocabulary. The model is the topic distribution of words, and it is shared by all units. When two or more units fetch tokens with the same word ID, a model update conflict happens. In this case, only one unit is allowed to perform sampling and model updates, and others need to wait until the next iteration.

A naive method to resolve the conflict is by static scheduling. Specifically, when there is a conflict, units always update the model following a fixed order. As illustrated in FIG. 2, during one iteration, each processing unit i (i=0, 1, ..., P-1) samples the topic and updates the model, if every prior unit j (j<i) fetches a word different from unit i, or does nothing, otherwise.

Another example of avoiding model update conflict is proposed in non-patent literature 1. This method partitions the model into P parts, each of which contains topic distributions of a subset of words. The dataset is also divided into P subsets at first, which will be sampled by P units. After that, each subset is further partitioned into P parts, each of which updates one part of the model. In this method, one learning epoch contains P iterations. At each iteration, P units will sample for tokens that associate with different parts of the model in parallel.

FIG. 3 gives an example when applying the mothed described in non-patent literature 1. In the example, there are 3 units, so the dataset is divided into 9 parts. The data partition (i,j) is processed by unit i, and it contains tokens belonging to the word subset. One learning epoch contains three iterations, and three data partitions are sampled at each iteration. Specifically, partitions (1,a), (2,b), and (3,c) are sampled in the first iteration in parallel. Partitions (1,b), (2,c), and (3,a) are sampled in the second iteration, and remaining partitions are sampled in the third iteration.

CITATION LIST

Non-Patent Literature

[NPL 1] "Parallel Inference for Latent Dirichlet Allocation on Graphics Processing Units" written by F. Yan, N. Xu, Y. A. Qi, published in 2009 by NIPS '09, PP. 2134-2142.

SUMMARY OF INVENTION

Technical Problem

The problem of the naive method is that the workload becomes more and more unbalanced among units with the learning process, because it follows a fixed order of sampling and model update. The method described in non-patent literature 1 is not suitable for devices with a large number of units, because it is hard to evenly partition data into subsets.

Solution to Problem

The present invention is a priority-aware sampling device, which is proposed to balance the workload among units in data parallel processing while avoiding model update conflicts. The present sampling device dynamically assigns higher priorities to units with more unprocessed word tokens at runtime. At each iteration, units that do not conflict with other units that have higher priorities can sample for the token and update the model in parallel. The effect of the present invention is that it balances the workload among units and thus reducing the overall execution time of the parallelized LDA.

BRIEF DESCRIPTION OF DRAWINGS

FIG. 13a is a diagram showing an example when applying the third embodiment.

FIG. 13b is a diagram showing an example when applying the third embodiment.

FIG. 13c is a diagram showing an example when applying the third embodiment.

DESCRIPTION OF EMBODIMENTS

Hereinafter, embodiments of the present invention will be described in detail with reference to accompanying drawings.

Embodiment 1

First, a first example embodiment of the invention is elaborated below referring to accompanying drawings.

Figure 1:
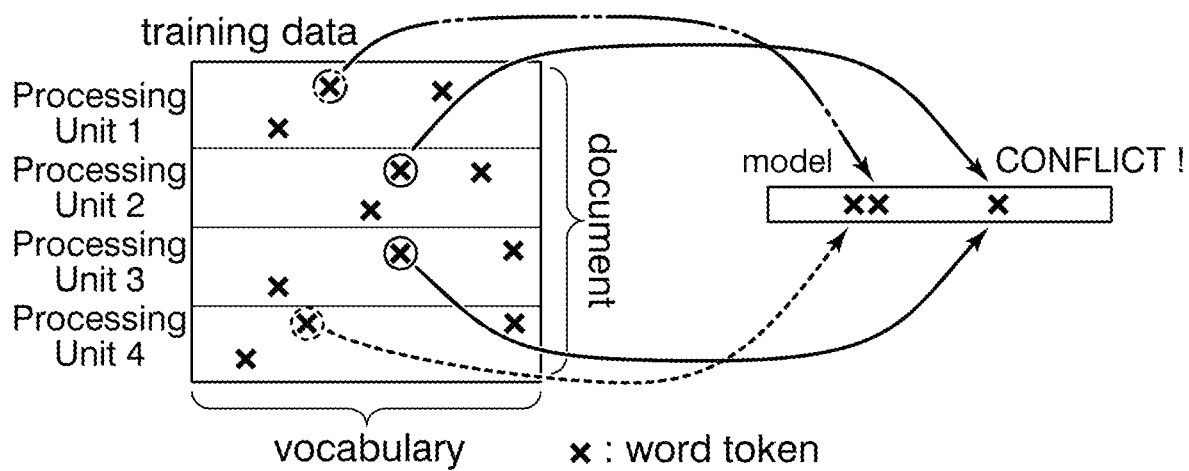
FIG. 1 is a diagram showing an example of the parallelized LDA implementation.
Figure 2:
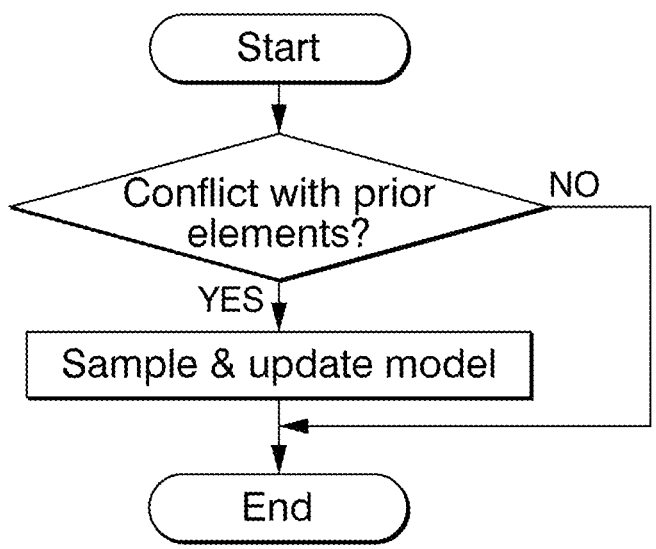
FIG. 2 is a flow diagram illustrating operations of the naive method.
Figure 3:
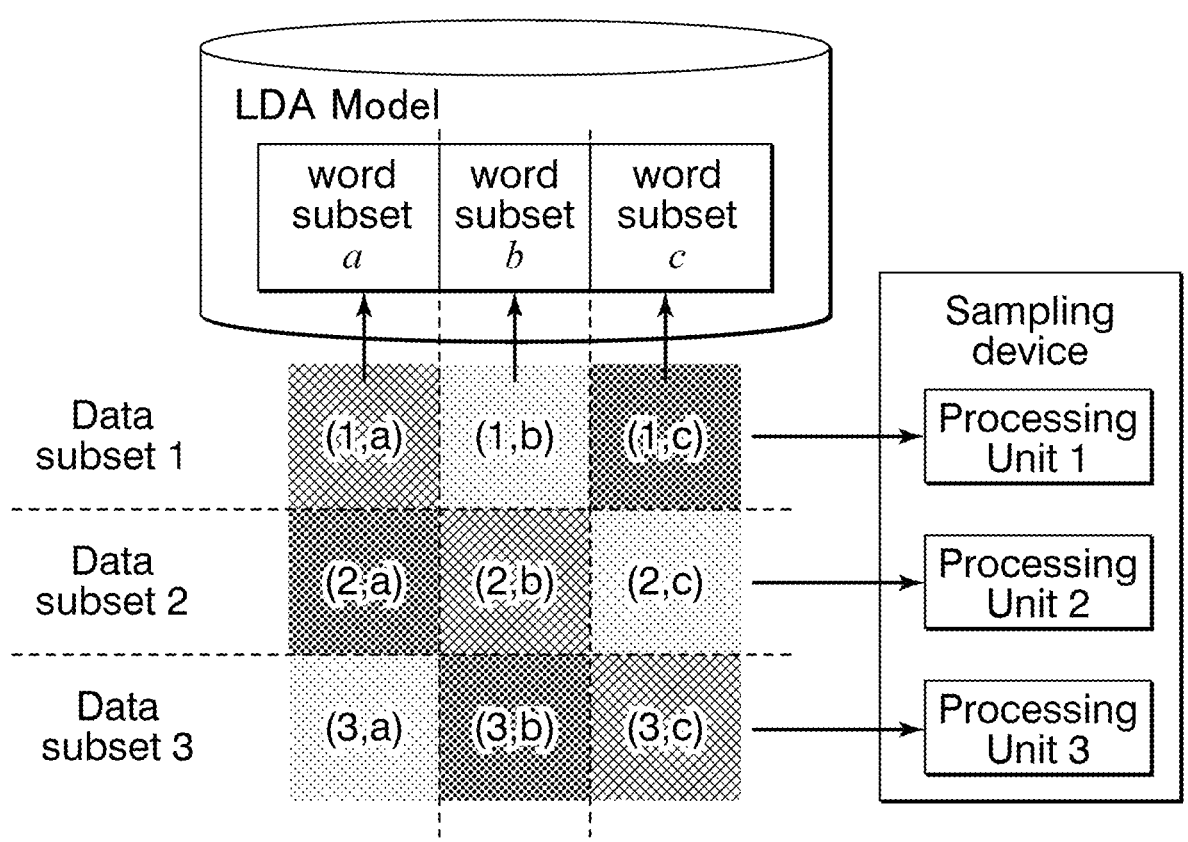
FIG. 3 is a diagram showing an example of the method described in non-patent literature 1.
Figure 4:
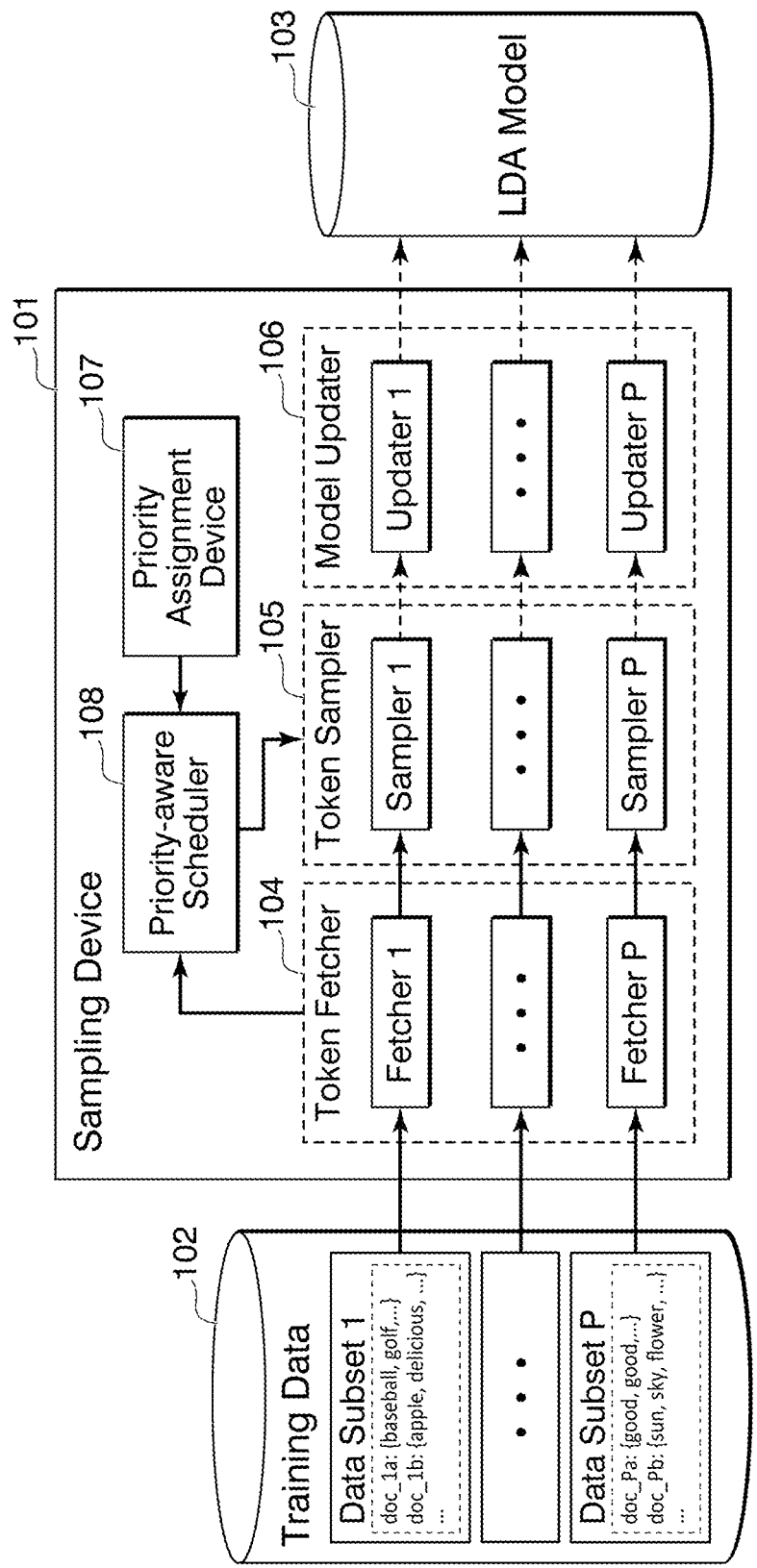
FIG. 4 is a block diagram illustrating the structure of the first embodiment.

FIG. 4 is the block diagram illustrating the overall structure of the present sampling device. The sampling device 101 fetches word tokens from training data 102, and updates the share model 103 at each learning epoch.

Training data 102 is a collection of documents, and each document contains multiple word tokens. Each token is mapped to a word ID, and there might be multiple tokens belonging to the same word ID. Training data 102 records the topic distribution of each document, and word ID and assigned topic ID of each word token. In the parallelized LDA, the dataset is partitioned into P subsets, each of which contains multiple documents. We partition in a way that the number of tokens in each subset is as close to N/P as possible, where N is the total number of tokens in the dataset and P is the number of available processing units in the sampling device. Each data subset is processed by one unit in parallel with others.

The LDA model 103 stores the topic distribution of each word. At each training epoch, the sampling device 101 re-assigns the topic to each token based on current distributions, and then updates the model according to the new topic ID.

The sampling device 101 is composed of a priority assignment device 107, a priority-aware scheduler 108 and multiple processing units. As shown in the figure, each processing unit includes a token fetcher 104, a sampler 105, and a model updater 106.

The priority-aware scheduler 107 is designed to resolve the model update conflict and balance the workload among units at runtime. If two or more units sample tokens with the same word ID, they will update the topic distribution of the same word, which causes memory access conflict. In this case, the scheduler allows the unit with the highest priority to do the sampling.

Figure 5:
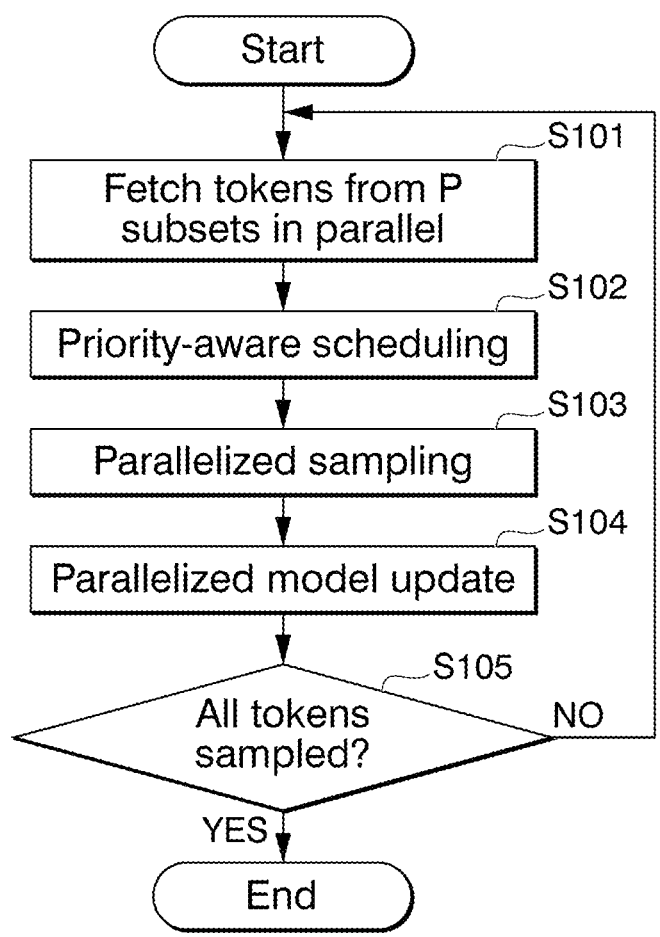
FIG. 5 is a flow diagram illustrating operations of one learning epoch when using the first embodiment.

FIG. 5 illustrates operations of one learning epoch. One learning epoch contains multiple iterations, and one iteration contains steps S101-S104.

In step S101, each fetcher 104 fetches the next token in its data subset, including the word ID, and current topic ID of the token.

In step S102, the scheduler 107 schedules P units based on their priority levels. This step is to ensure workload balancing and avoid model update conflict. The output of step 102 is sampling-enable indicators for units, and it determines which units are enabled to do the sampling at the current iteration. The detailed operations in this step will be presented later.

In step S103, token samplers 105 of enabled units sample the new topic for their next token in parallel.

In step S104, model updaters 106 of enabled units update the topic distribution model according to the new topic assignment in parallel.

After finishing one iteration, the sampler device checks whether or not all tokens in the dataset have been sampled (step S105). If the device has processed all the data, the epoch ends. Otherwise, the device repeats steps S101-S105.

Figure 6:
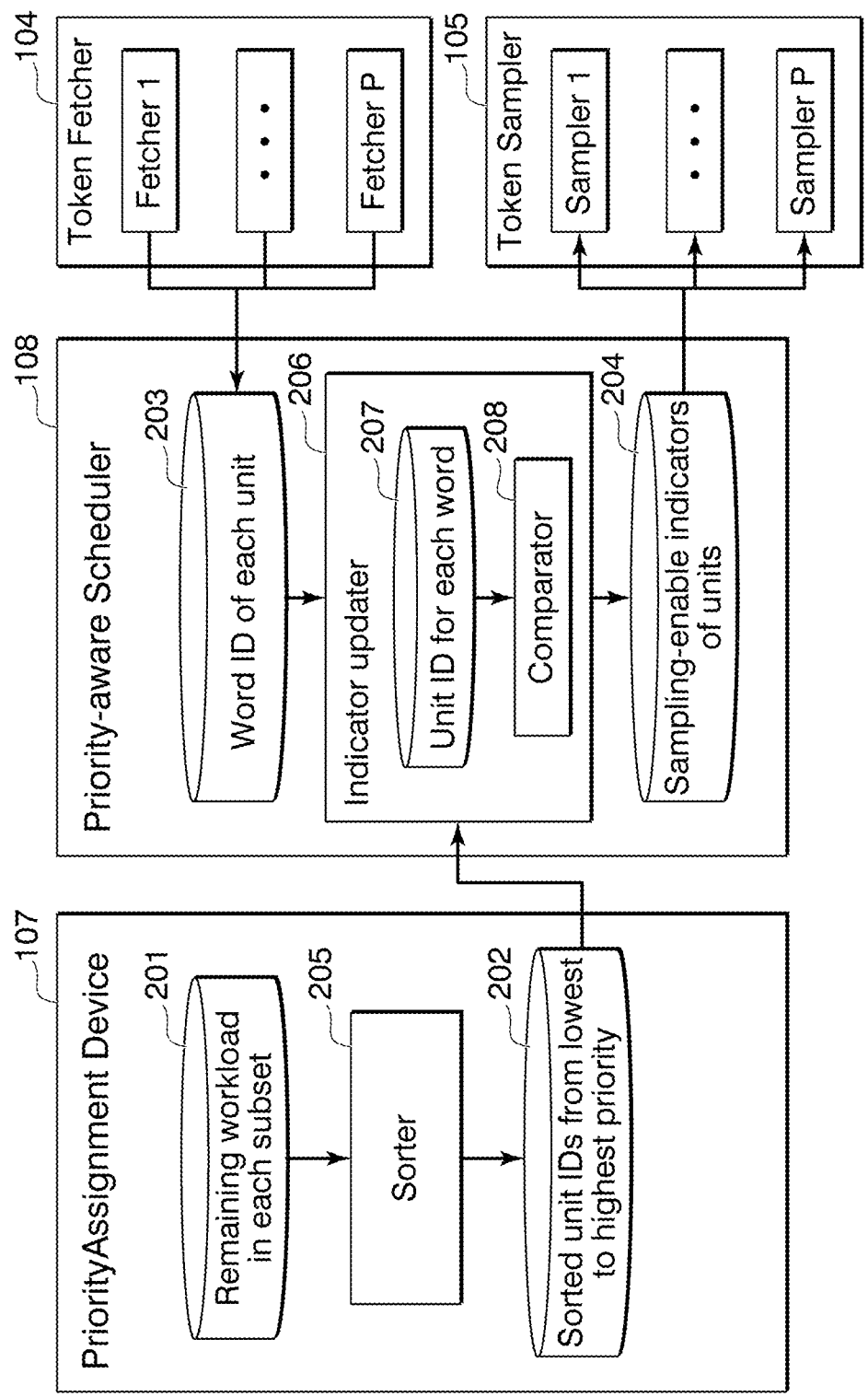
FIG. 6 is a block diagram illustrating the structure of the priority-aware scheduler in the first embodiment.

FIG. 6 gives the detailed structure of the priority assignment device 107 and the priority-aware scheduler 108. As shown in the figure, the priority assignment device 107 includes a sorter 205, a workload array 201, and a unit ID array 202. The scheduler 108 includes an indicator updater 206, a word ID array 203, and an enable/disable array 204. The scheduler 108 loads word IDs from token fetchers 104 to the word ID array 203 and outputs the enable/disable array 204 to enable or disable token samplers 105.

The size of arrays 201-204 is P, the number of processing units in the device. The workload array 201 stores the remaining workload in each data subset, specifically, the number of unprocessed tokens. The unit ID array 202 stores the processing unit IDs in ascending order in priority levels of processing units. The word ID array 203 stores word IDs of P tokens fetched by P units at the current iteration. The enable/disable array 204 stores sampling-enable indicators of units.

The indicator updater 206 contains an indicator unit ID array 207 and a comparator 208. The indicator unit ID array 207 has W entries, where W is the number of unique words that appear in the training data. Each entry records the ID of the unit that can sample for the corresponding word at current iteration. It performs like a "lock" of words. At each iteration, at most one unit can acquire the "lock" of a word, so as to ensure there is no model update conflict.

Figure 7:
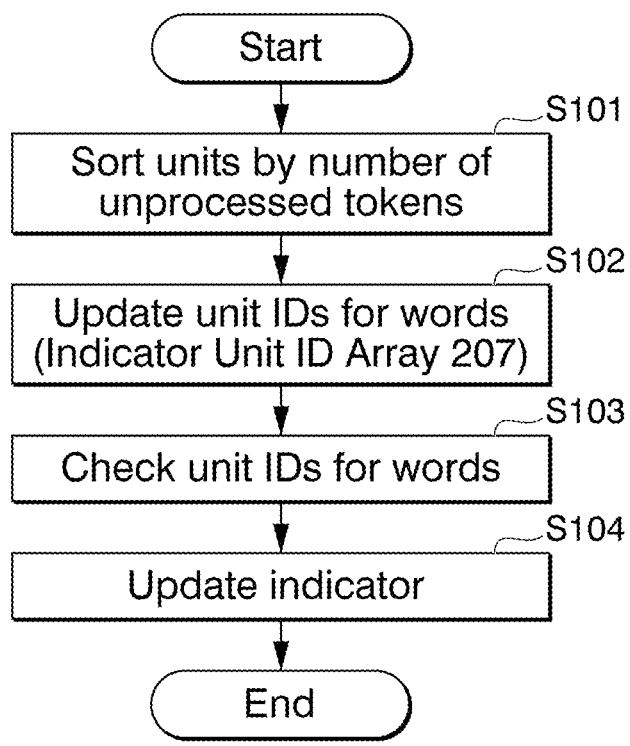
FIG. 7 is a flow diagram illustrating operations of priority-aware scheduling.

FIG. 7 illustrates the priority-aware scheduling in details. The flowchart indicates the operations done by the device 107 and the scheduler 108 at each iteration.

In step S201, the sorter 205 takes the workload array 201 as sorting keys and sorts units in ascending order in levels of priority. To balance the workload among units, higher priority levels are assigned to units with more unprocessed tokens. The sorted sequence of unit IDs is stored in the unit ID array 202.

In step S202, the updater 206 updates the unit IDs for words. Initially, all entries of the indicator unit ID array 207 are initialized to −1, which means all words are "unlocked". The updater 206 writes unit IDs to word entries corresponding to the fetched tokens. The ID of the unit with the lowest priority level will be written to the array first. Units with higher priorities can overwrite the prior units which fetch the same word. In this way, it is guaranteed that units with higher priorities can do the sampling and those with lower priorities need to wait when conflicts exist.

In step S203, the comparator 208 reads values from the indicator unit ID array 207 and checks which units have acquired the lock.

In step S204, the updater 206 sets the sampling-enable indicators for all units according to the comparison results.

FIG. 8 shows an example of the scheduling process. Suppose there are 4 units (unit 1-unit 4) in the sampling device and 8 unique words (word a-word h) in the dataset.

Figure 8A:
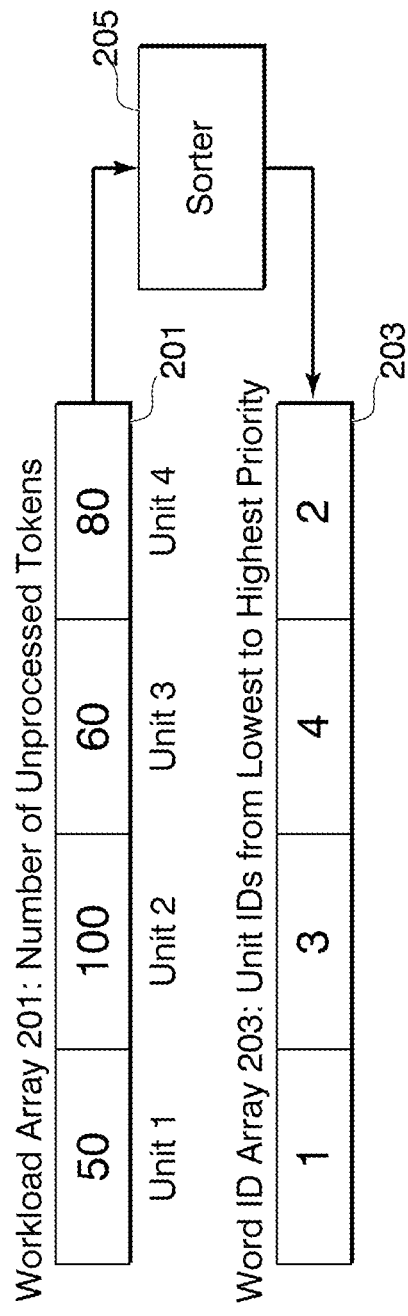
FIG. 8a is a diagram showing an example of priority-aware scheduling.

As shown in FIG. 8a, units 1 to 4 have 50, 100, 60, and 80 unprocessed tokens, respectively. Therefore, the lowest priority is assigned to unit 1 while the highest priority is assigned to unit 2. The sorted units are stored in the unit ID array 202 in ascending order in priority level, as shown in the figure.

Figure 8B:
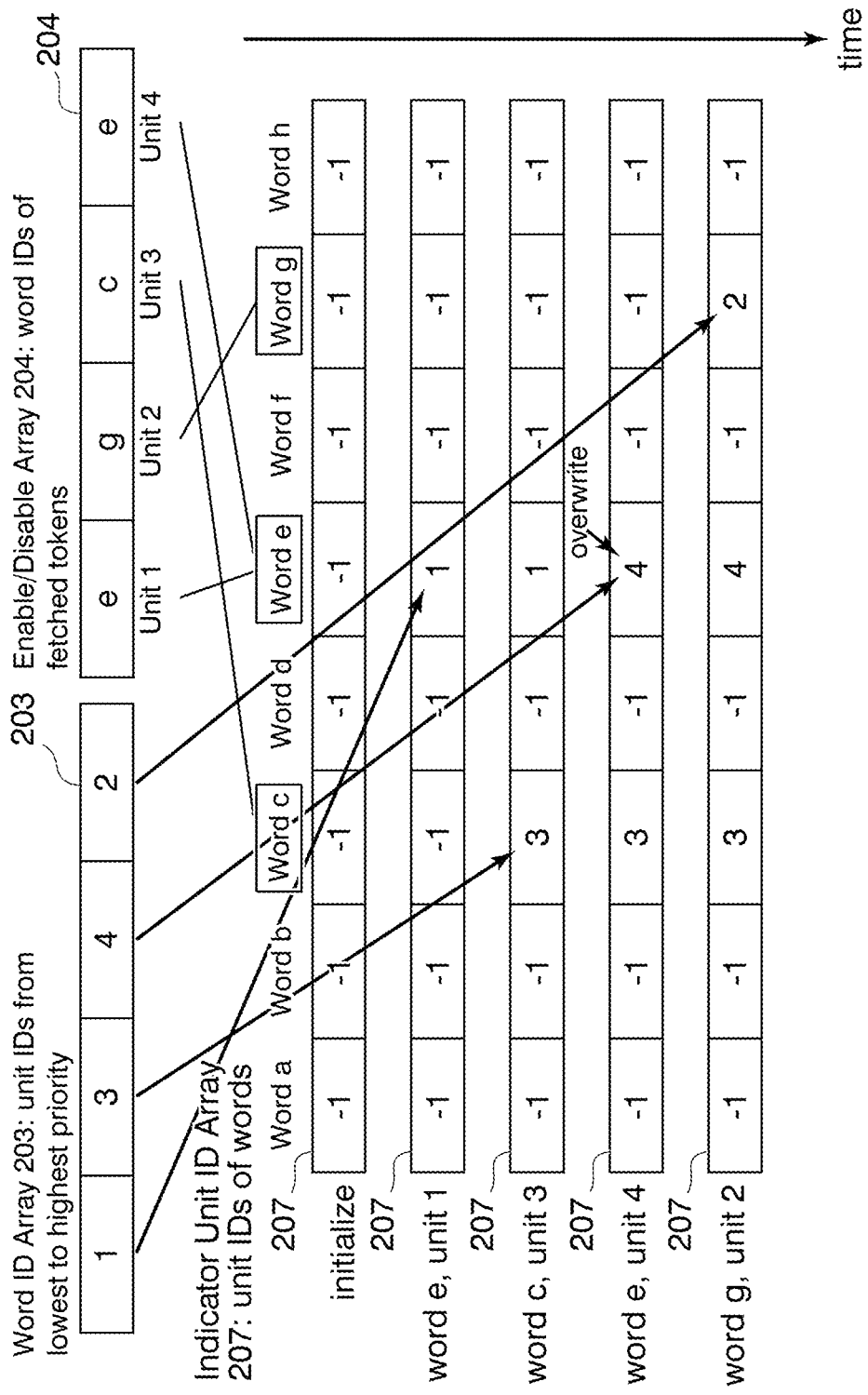
FIG. 8b is a diagram showing an example of priority-aware scheduling.

FIG. 8*b* illustrates how the indicator unit ID array 207 is updated in S202. Initially, entries of all eight words are −1. Then it is updated following the ascending order of priority levels of units. Unit 1 has the lowest priority and it fetches a token of the word e, so the entry of the word e is set to 1 at first. Similarly, the entry of the word g is set to 3. Unit 4 fetches the same word as unit 1 but has higher priority than unit 1, so the entry of the word e is overwritten by 4. After going through all units, we get the array 2007 shown at the bottom of FIG. 8*b*.

Figure 8C:
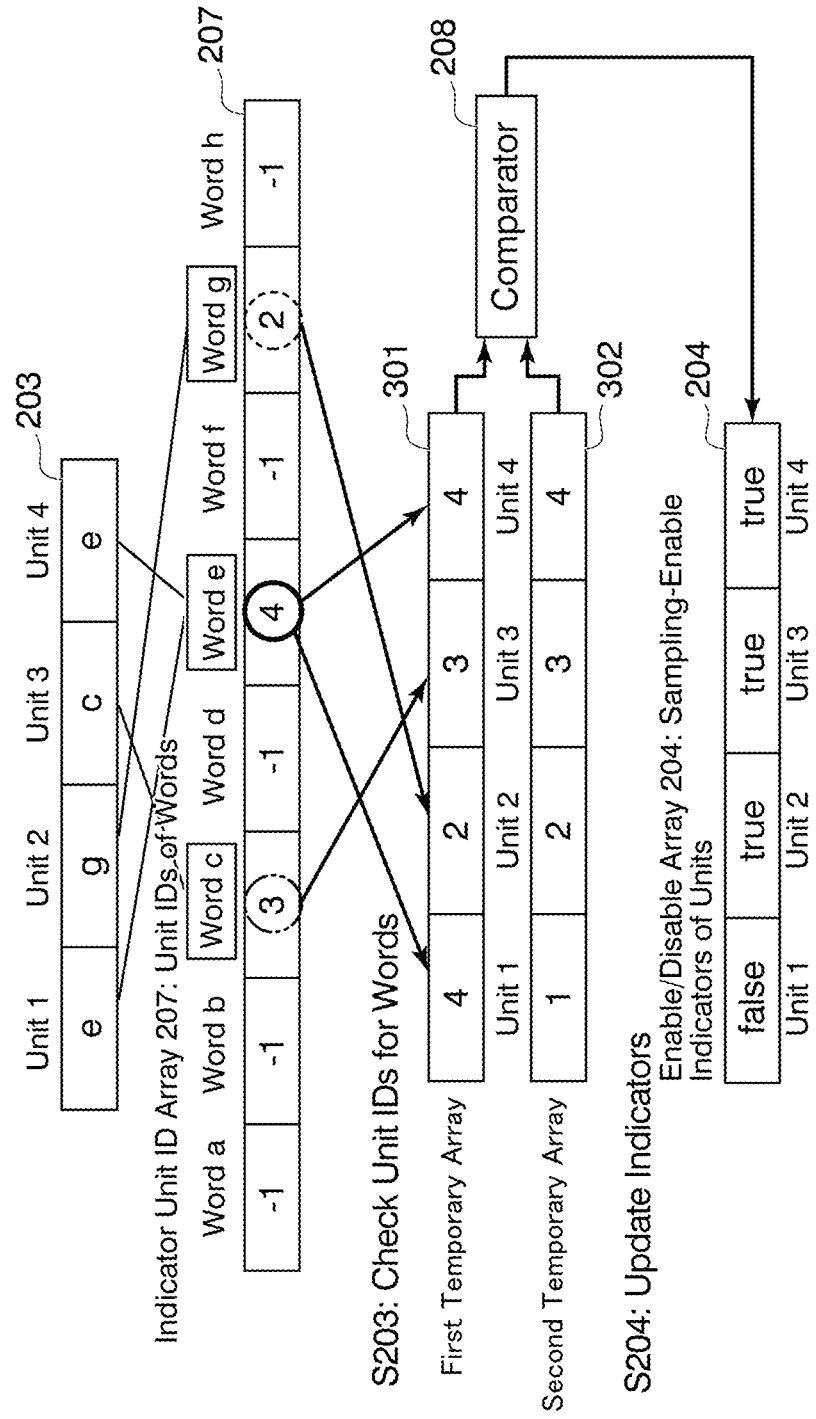
FIG. 8c is a diagram showing an example of priority-aware scheduling.

FIG. 8*c* shows how the updater 206 sets sampling-enable indicators for units in S203 and S204.

Firstly, unit IDs that acquire the lock are loaded in a first temporary array 301, and it is then compared with a second temporary array 302. The comparator 208 performs an element-wise comparison of the first temporary array 301 and the second temporary array 302. If they are equal, the corresponding indicator is set to true. Otherwise, it is set to false. In the presented example, unit 1 cannot sample at this iteration as it has conflict with unit 4, which has more unprocessed tokens and thus a higher priority level than unit 1.

Although four units and eight words are presented in the example, the number of units and words is not limited when applying the present invention.

As the present example embodiment schedules units according to their amount of remaining workload, it is possible to balance the workload among units at runtime.

Embodiment 2

Next, a second example embodiment of the present invention is described referring to accompanying drawings.

Figure 9A:
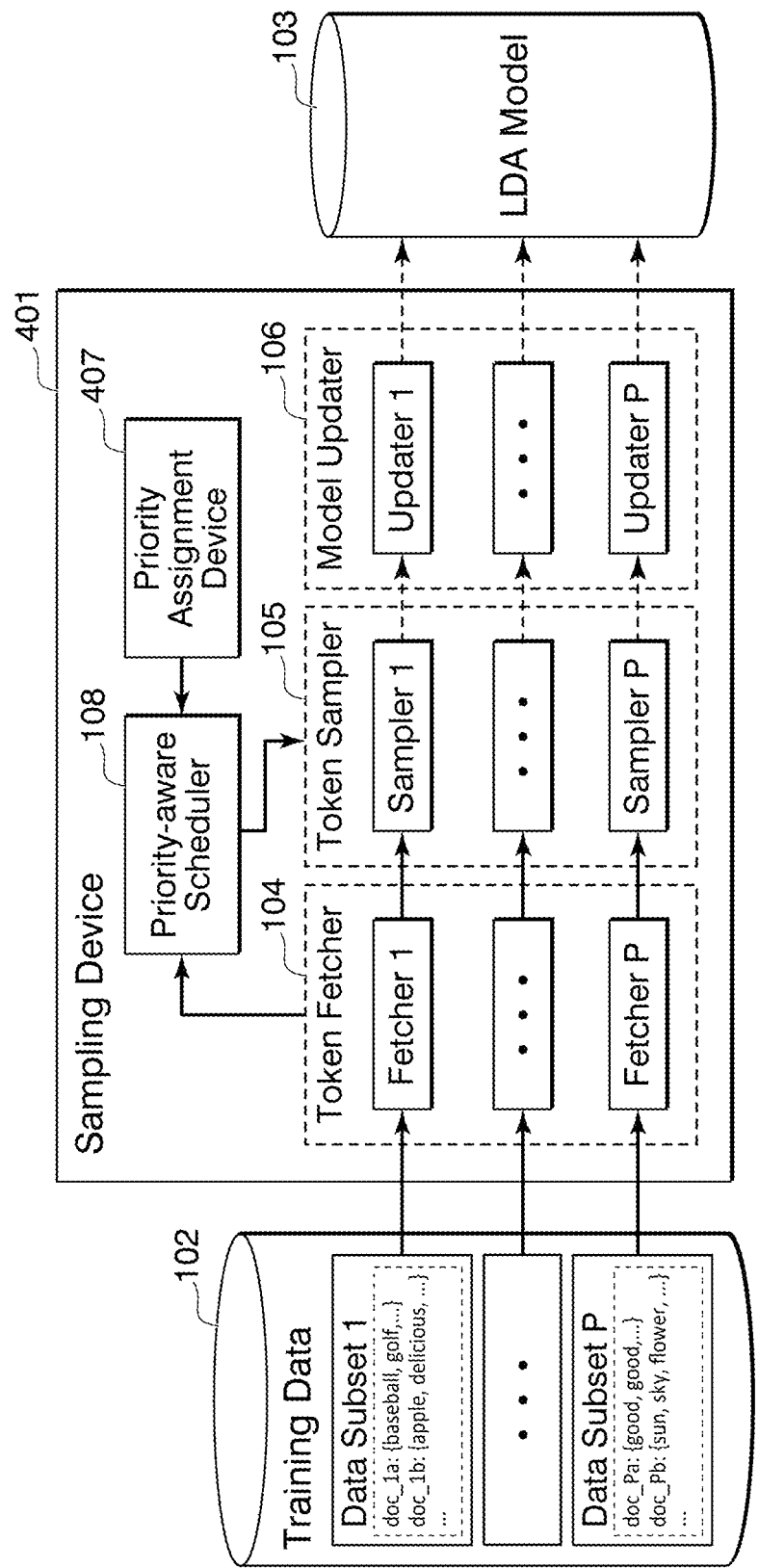
FIG. 9a is a block diagram illustrating the structure of the second embodiment.

Referring to FIG. 9*a*, the second example embodiment of the sampling device 401 includes token fetchers 104, token samplers 105, model updaters 106, a priority-aware scheduler 108, and a priority assignment device 407. Compared to the first embodiment, the priority assignment device is different while other components remain unchanged.

Figure 9B:
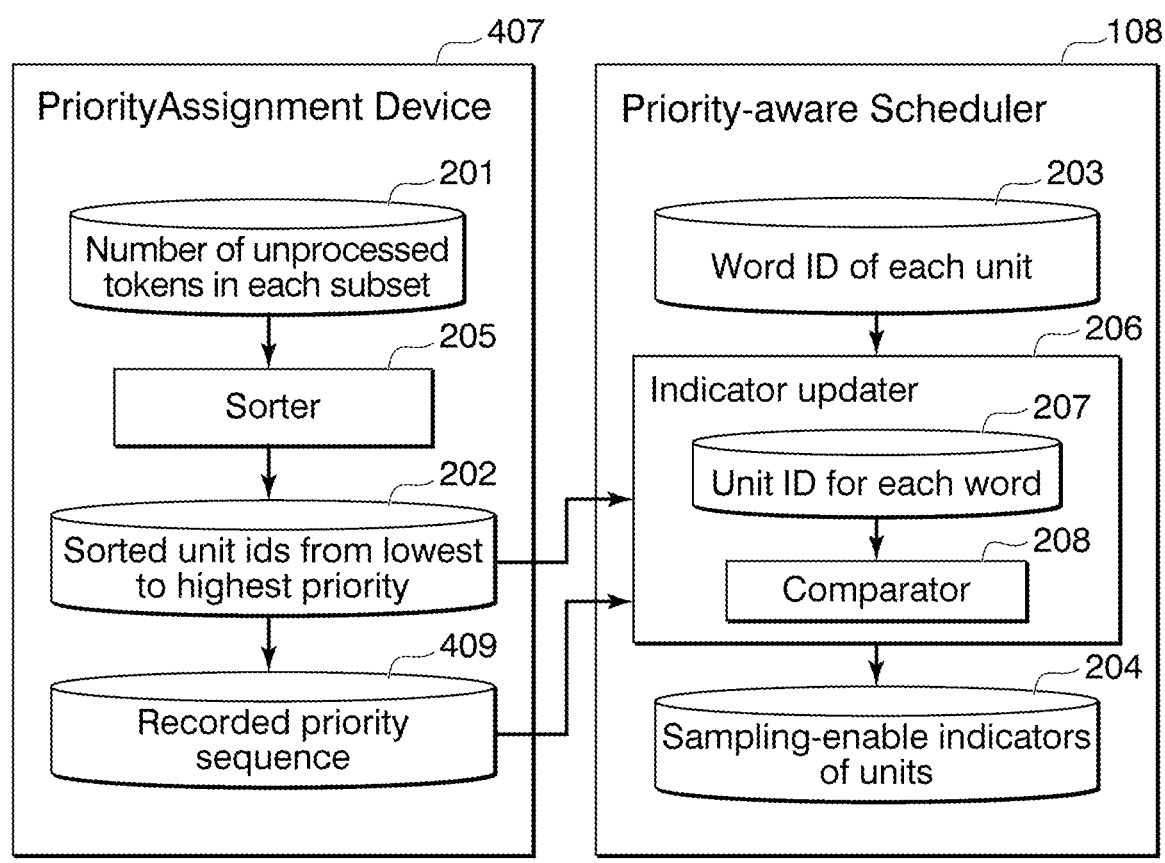
FIG. 9b is a block diagram illustrating the structure of the second embodiment.

The detailed structure of the priority assignment device 407 is shown in FIG. 9*b*. Compared to the priority assignment device 107 in the first embodiment, a priority sequence array 409 is added to the priority assignment device 407, which is used to store the priority sequence. Sorting is time-consuming, so it is inefficient to re-assign priority levels to units at each iteration. Instead, we update the priority sequence of units every N iterations to avoid significant sorting overhead.

Figure 10:
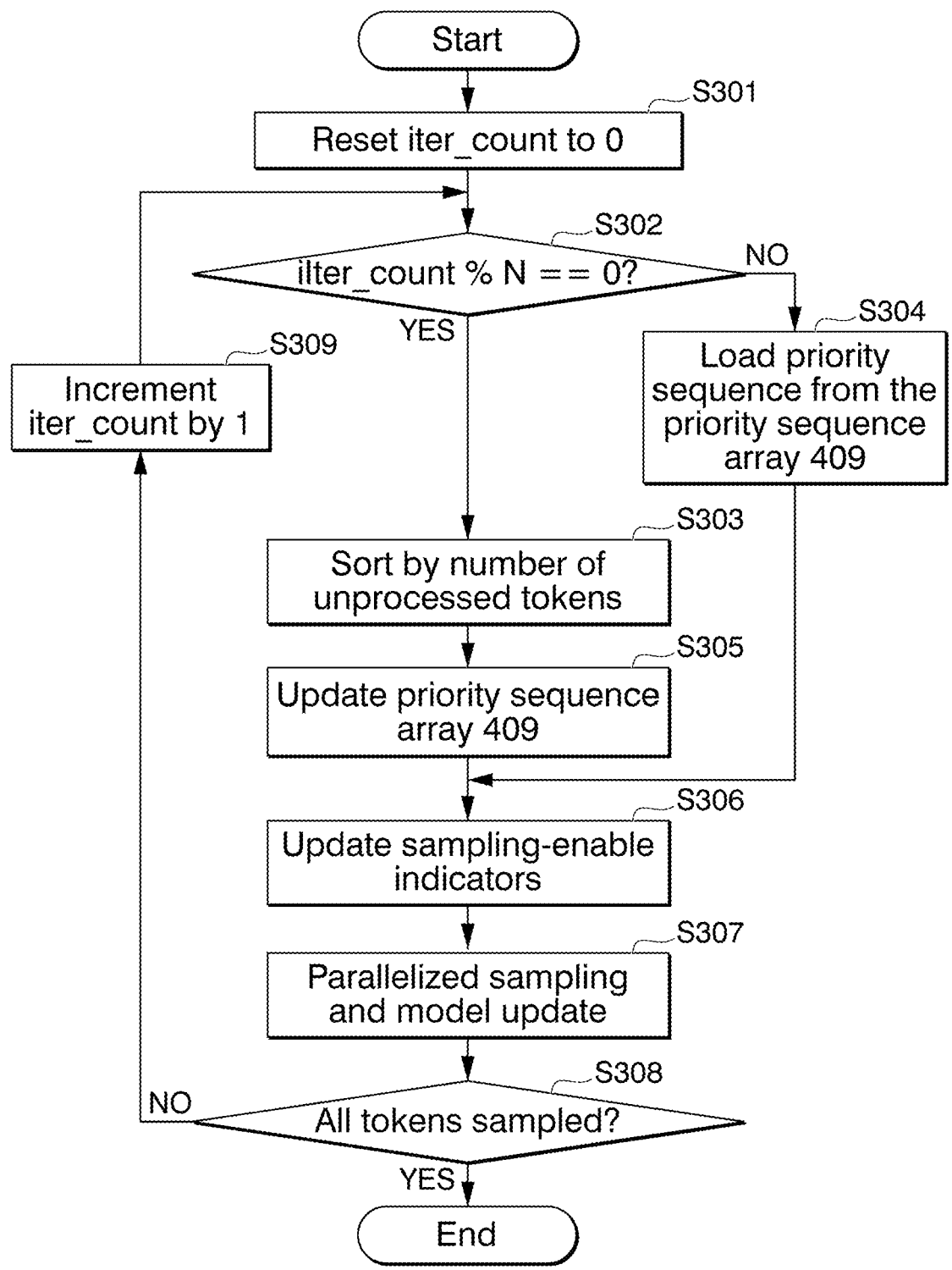
FIG. 10 is a flow diagram illustrating operations of one learning epoch when using the second embodiment.

FIG. 10 is the work-flow of one epoch when applying the second embodiment.

In step S301, the iteration count is reset to 0.

In step S302, the priority assignment device 407 checks whether the iteration count is divisible by N or not.

If the output of S302 is true, the sorter 205 sorts units by the amount of remaining workload in step S303, and then saves the sorted sequence in the priority sequence array 409 in step S305.

In other cases, the updater 206 directly loads the priority sequence from the priority sequence array 409.

In step S306, the updater 206 updates the indicators.

In step S307, units enabled by the scheduler perform sampling for tokens, and update related models in parallel.

In step S308, the device checks whether all tokens have been sampled or not. If there are unprocessed tokens, the iteration count is increased by one and the device repeats from step S302.

Since the present example embodiment is configured in such a manner that priority levels of units are re-assigned every N iterations instead of at each iteration, the present example embodiment is capable of reducing the overhead of scheduling.

Embodiment 3

Next, a third example embodiment of the present invention is described with reference to the accompanying drawings.

Figure 11A:
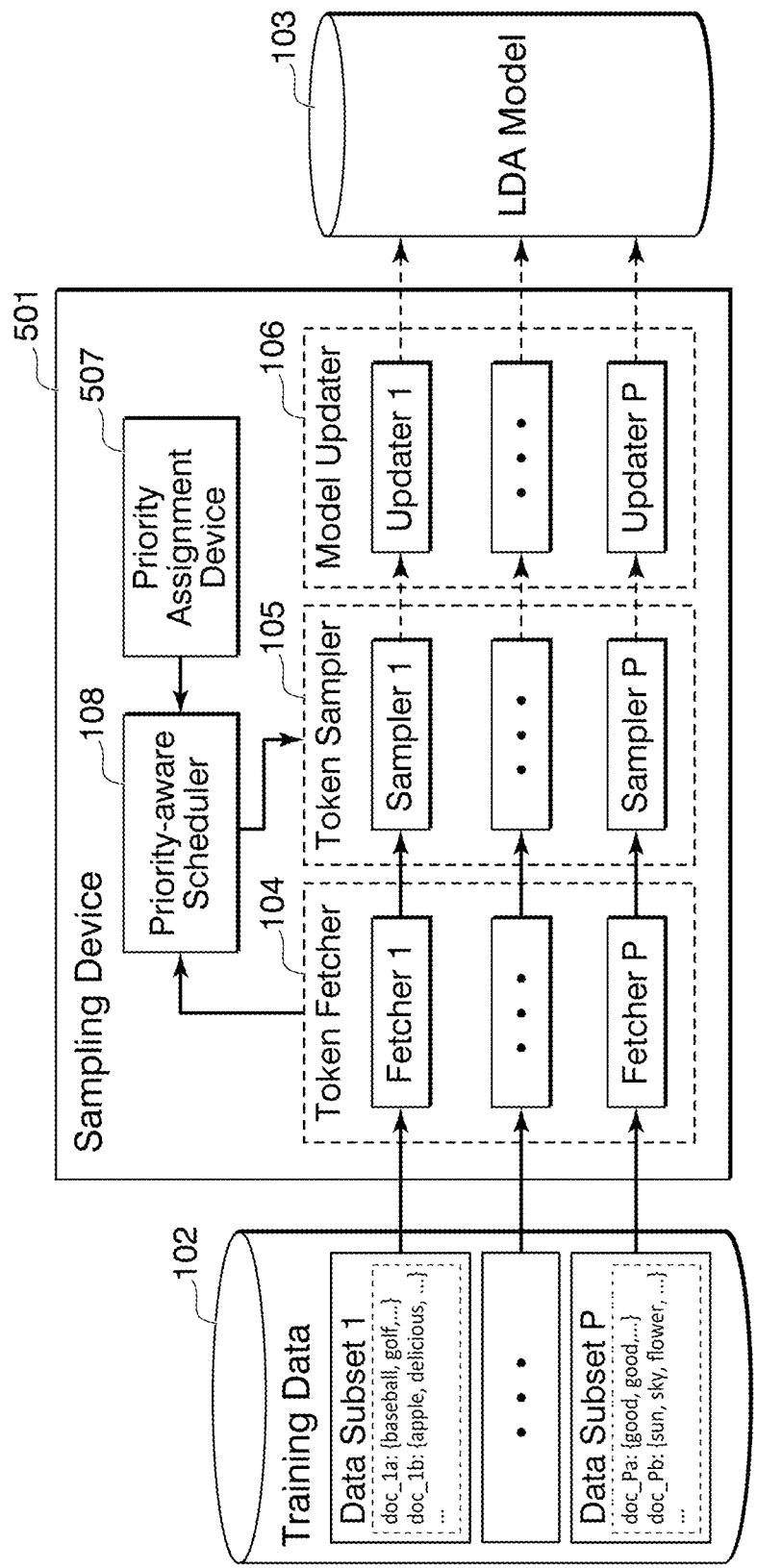
FIG. 11a is a block diagram illustrating the structure of the third embodiment.
Figure 11B:
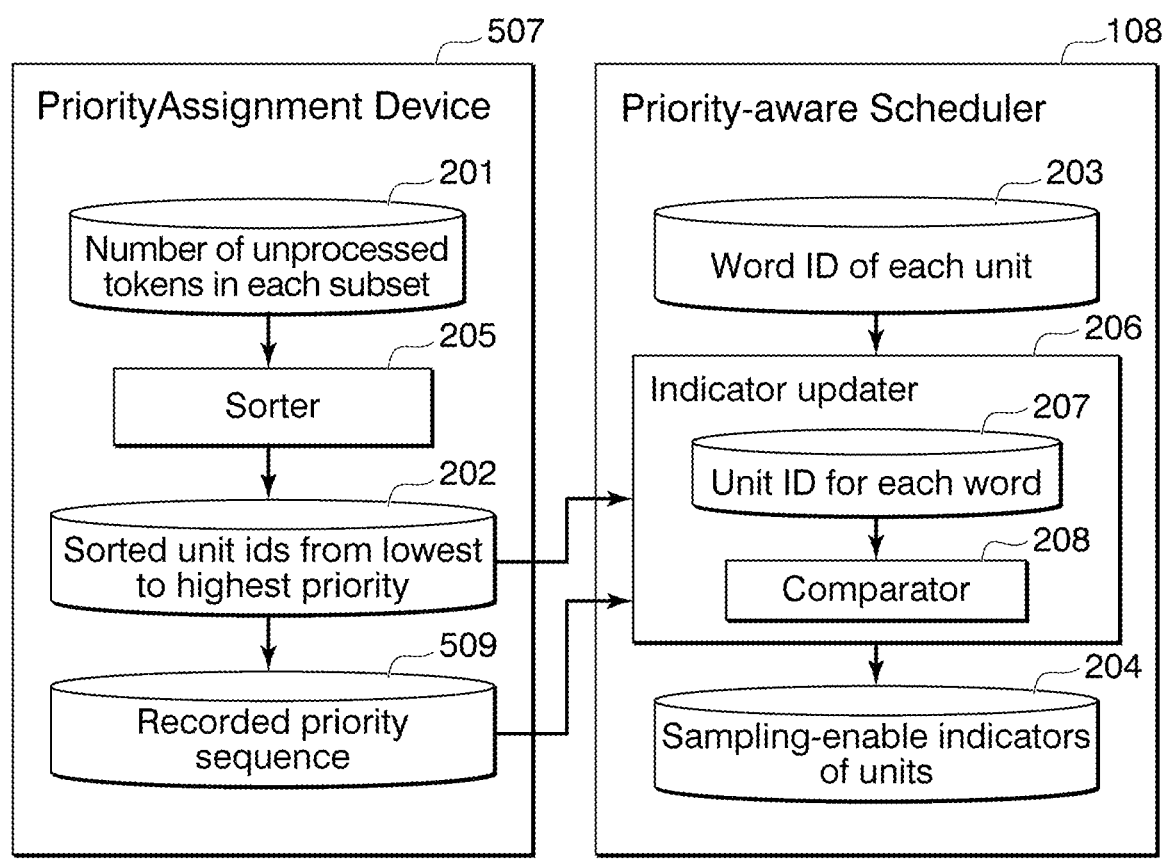
FIG. 11b is a block diagram illustrating the structure of the third embodiment.

FIG. 11*a* is a structural diagram of the third embodiment. It contains a modified priority assignment device 507, and other components are the same as the first two embodiments. The detailed structure of the modified priority assignment device 507 is shown as FIG. 11*b*.

The modified priority assignment device 507 contains a sorter 205, a workload array 201, a unit ID array 202, and a sorted sequence array 509. The components 201, 202, and 205 are the same as those in the first embodiment. The sorted sequence array 509 is used to store sequences of sorted arrays that are needed during one learning epoch.

For a fixed sorting frequency N, the scheduling of units will remain unchanged from one epoch to another, so there is no need to sort units at each epoch. Alternatively, the sequences of sorted units can be stored in the sorted sequence array 509 and reused in multiple epochs.

When applying the present embodiment, users can either fix N at the beginning, or explore different values during the initial learning epochs and then fix it to the frequency that leads to the smallest number of iterations.

Figure 12:
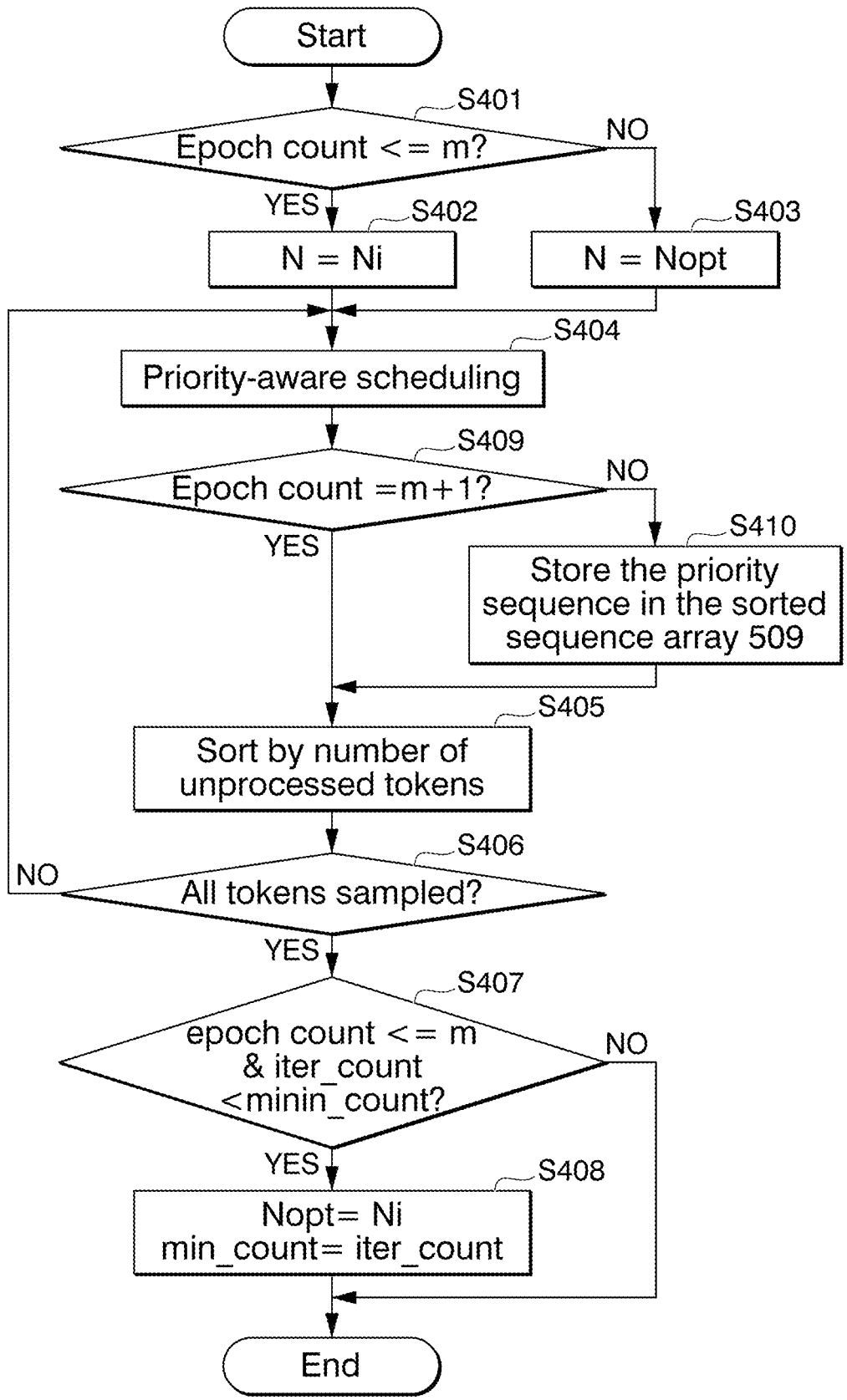
FIG. 12 is a flow diagram illustrating operations of one learning epoch when using the third embodiment.

FIG. 12 shows the work-flow of the latter method. Suppose that a set of candidate values for N, i.e. N1, N2, N3, . . . , Nm, is provided by the user.

In step S401, the sampling device checks whether the epoch count is smaller than m. During the first m epochs, N is set to one of the candidate value, Ni, in step S402, where i is the epoch count.

After the exploration phase, N is set to the frequency that provides the best performance, Nopt, in step S403.

Steps S404-S406 are the same as S301-S308 shown in FIG. 10.

In step S407, after finishing sampling for all tokens, the devices check the iteration count of the current epoch. During the first m epochs, if the iteration count of the current epoch is smaller than the minimum, the minimum iteration count is updated, and the optimal frequency Nopt to the current frequency Ni is set in step S408.

As steps S401 and S403 indicate, the frequency of sorting units is fixed to Nopt after m learning epochs. At the (m+1)th epoch, we record the priority sequences of units in the sorted sequence array 509 at the step 410.

FIG. 13 shows an example of the scheduling method when applied in a 4-unit sampling device. At the first 5 epochs, the scheduler sorts units at different frequencies. Comparing these five candidate values, smallest iteration count is achieved when N is 250, and the corresponding iteration count is 1200. At the 6th epoch, the scheduler sorts units every 250 iterations. As the total iteration count is 1200, units will be sorted five times, and these five sorted sequences of units will be stored in the sorted sequence array 509, shown as FIG. 13*b*. From the 7th epoch, the scheduler directly gets the priority levels of units from the sorted sequence array 509. For example, in the first 250 iterations of the 7th and latter epochs, the scheduler updates the sampling-enable indicators of units according to the first sorted sequence. Other sequences are used in the following iterations similarly.

To avoid the sorted sequence array 509 occupying too much memory space, the user can limit the times of priority assignment. In the example above, if the priority sequence of units is allowed to change at most three times at each epoch, the sorted sequence array 509 becomes FIG. 13c. Different from FIG. 13b, units are scheduled following the same priority sequence during iterations 510-1200.

Next, the effect of the present example embodiment is described. The present embodiment determines the frequency of priority re-assignment by exploring different values, so it is possible to reduce the number of iterations needed to finishing processing all tokens, thus speeding up the execution.

In addition, the priority sequences are stored in memory and reused during the learning process, so that the scheduling overhead is further reduced.

It should be noted that the above described arrays may be implemented in one or more memory storage devices such as RAM.

Furthermore, example embodiments in accordance with the present example embodiments may be implemented as an apparatus, a device, a method, or a computer program product. Accordingly, the present example embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present example embodiments may take the form of a computer program product embodied in any tangible medium of expression having computer-usable program code embodied in the medium. For example, all of the functions performed by the individual hardware units of the example embodiments may be performed in software on a general purpose computer having a basic structure as that shown in FIG. 7, wherein instructions may be stored in memory 161 and processed by a CPU 160, and wherein the computer may communicate with data sources 110 via an I/O unit 162 in order to output an analysis result 140.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

REFERENCE SIGNS LIST

1 Processing Unit
2 Processing Unit
3 Processing Unit
4 Processing Unit
101 Sampling Device
102 Training Data
103 Share Model
104 Token Fetcher
105 Token Sampler
106 Model Updater
107 Priority Assignment Device
108 Priority-Aware Scheduler
201 Workload Array
202 Unit ID Array
203 Word ID Array
204 Enable/Disable Array
205 Sorter
206 Indicator Updater
207 Indicator Unit ID Array
208 Comparator
301 First Temporary Array
302 Second Temporary Array
401 Sampling Device
407 Priority Assignment Device
409 Priority Sequence Array
507 Modified Priority Assignment Device
509 Sorted Sequence Array

The invention claimed is:

1. A sampling device comprising:
a plurality of first processors that are each configured to:
fetch word tokens from a dataset;
sample topics for the fetched word tokens; and
update a Latent Dirichlet Allocation (LDA) model;
at least one memory storing instructions; and
at least one second processor configured to execute the instructions to:
determine first priority levels of the first processors;
determine, if a same word token is fetched by two or more first processors among the plurality of the first processors, second priority levels of the two or more first processors based on a number of the word tokens in the dataset;
schedule the first processors based on the first priority levels and the second priority levels;
record, in a word array, a word ID of a next word token for each first processor;
store, in an enable/disable array, a sampling-enable indicator of each first processor; and
update the sampling-enable indicator of each first processor.

2. The sampling device according to claim 1, wherein the at least one second processor is configured to execute the instructions to:
sort the first processors based on remaining workloads thereof;
store, in a workload array, amounts of the remaining workload; and
store, in an ID array, first processor IDs of the first processors as have been sorted.

3. The sampling device according to claim 2, wherein the at least one second processor is configured to execute the instructions to
record sequences of the first processors as have been sorted, in a sorted sequence array.

4. The sampling device according to claim 1, wherein the at least one processor is configured to execute the instructions to:
record, in an ID array, a first processor ID for each word; and
check which of the first processors have acquired a lock for each word.

5. The sampling device according to claim 1, wherein if the same word token is fetched by the two or more first processors, one of the two or more first processors that has a greater number of the word tokens than another of the two or more first processors is assigned with a higher second priority level than the another of the two or more first processors.

6. A parallelized Latent Dirichlet Allocation (LDA) method comprising:
- fetching, by each of a plurality of first processor and in a parallel manner, tokens from a dataset in a parallel manner;
- sampling, by each first processor, topics for the fetched word tokens;
- updating, by each first processor and in a parallel manner, an LDA model, based on the sampled topics;
- determining, by a second processor, first priority level of the first processors;
- determining, by the second processor, if a same token is fetched by two or more first processors among the plurality of the first processors, second priority levels of the two or more processors based on a number of the word tokens in the dataset;
- scheduling, by the second processor, the first processors based on the first priority levels and the second priority levels;
- recording, by the second processor and in a word array, a word ID of a next word token for each first processor;
- storing, by the second processor and in an enable/disable array, a sampling-enable indicator of each first processor; and
- updating, by the second processor and the sampling-enable indicator of each first processor.

7. A non-transitory computer readable storage medium storing instructions to cause:
- fetching, by each of a plurality of first processor and in a parallel manner, tokens from a dataset in a parallel manner;
- sampling, by each first processor, topics for the fetched word tokens;
- updating, by each first processor and in a parallel manner, a Latent Dirichlet Allocation (LDA) model, based on the sampled topics;
- determining, by a second processor, first priority level of the first processors;
- determining, by the second processor, if a same token is fetched by two or more first processors among the plurality of the first processors, second priority levels of the two or more processors based on a number of the word tokens in the dataset;
- scheduling, by the second processor, the first processors based on the first priority levels and the second priority levels;
- recording, by the second processor and in a word array, a word ID of a next word token for each first processor;
- storing, by the second processor and in an enable/disable array, a sampling-enable indicator of each first processor; and
- updating, by the second processor and the sampling-enable indicator of each first processor.

* * * * *